US012655025B2

(12) United States Patent (10) Patent No.: US 12,655,025 B2

Harutyunyan (45) Date of Patent: Jun. 16, 2026

(54) METHOD FOR FUSION OF CARBON NANOSTRUCTURES

(71) Applicant: HONDA MOTOR CO., LTD., Tokyo (JP)

(72) Inventor: Avetik R. Harutyunyan, Santa Clara, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 748 days.

(21) Appl. No.: 18/066,737

(22) Filed: Dec. 15, 2022

(65) Prior Publication Data

US 2024/0199423 A1 Jun. 20, 2024

(51) Int. Cl.
C01B 32/162 (2017.01)
B82Y 40/00 (2011.01)

(52) U.S. Cl.
CPC ............ C01B 32/162 (2017.08); B82Y 40/00 (2013.01); *C01P 2004/13* (2013.01)

(58) Field of Classification Search
CPC ....... C01B 32/162; B82Y 30/00; B82Y 40/00; C01P 2004/13
See application file for complete search history.

(56) References Cited

U.S. PATENT DOCUMENTS

| 6,869,583 | B2 | 3/2005 | Harutyunyan et al. | |
| 7,611,687 | B1 * | 11/2009 | Harutyunyan | ........ C01B 32/162 |
| | | | | 204/157.43 |
| 2019/0256356 | A1 * | 8/2019 | Hou | ...................... C01B 32/159 |

OTHER PUBLICATIONS

Lepro, Xavier, et al. "Production and characterization of coaxial nanotube junctions and networks of CNx/CNT." Nano letters 7.8 (2007): 2220-2226.*
Tuukkanen, Sampo, et al. "Toward full carbon interconnects: High conductivity of individual carbon nanotube to carbon nanotube regrowth junctions." Applied Physics Letters 95.11 (2009).*
Kis, Andras, et al. "Reinforcement of single-walled carbon nanotube bundles by intertube bridging." Nature materials 3.3 (2004): 153-157.*
Jiang, Jinlong, et al. "Growing carbon nanotubes from both sides of graphene." ACS applied materials & interfaces 8.11 (2016): 7356-7362.*

(Continued)

*Primary Examiner* — Richard M Rump
(74) *Attorney, Agent, or Firm* — ArentFox Schiff LLP; Mark Duell

(57) ABSTRACT

A method of making an assembly of fused carbon nanostructures that includes providing a plurality of carbon nanostructures, combining the plurality of carbon nanostructures with a plurality of catalyst particles to provide a catalyst-nanostructure assembly, heating the catalyst-nanostructure assembly to a first temperature sufficient to provide at least one etched portion, thereby providing an etched catalyst-nanostructure assembly, the at least one etched portion being etched from at least one of the plurality of carbon nanostructures and proximal to at least one of the plurality of catalyst particles, contacting the etched catalyst-nanostructure assembly with a carbon source, and heating the etched catalyst-nanostructure assembly and the carbon source to a second temperature sufficient to provide at least one carbon bridge.

14 Claims, 8 Drawing Sheets

(56)                    References Cited

OTHER PUBLICATIONS

Ting, Jyh-Ming, and Wen-Chen Lin. "Unprecedented re-growth of carbon nanotubes on in situ re-activated catalyst." Nanotechnology 20.2 (2009): 025608.*

Bu, Ian YY, Kai Hou, and Daniel Engstrom. "Industrial compatible re-growth of vertically aligned multiwall carbon nanotubes by ultrafast pure oxygen purification process." Diamond and related materials 20.5-6 (2011): 746-751.*

Wang, Huafeng, et al. "Re-growth of single-walled carbon nanotube by hot-wall and cold-wall chemical vapor deposition." Carbon 95 (2015): 497-502.*

Avetik R. Harutyunyan et al., "Purification of Single-Wall Carbon Nanotubes by Selective Microwave Heating of Catalyst Particles", J. Phys. Chem. B 2002, 106, pp. 8671-8675.

Florian Banhart., "Irradiation effects in carbon nanostructures", Reports on Progress in Physics, 62 pp. 1181-1221, (1999).

Guoqing Wang et al., "Digital noise spectroscopy with a quantum sensor", arXiv:2212.09216v1 [quant-ph] Dec. 19, 2022, (32 Page Total).

Jing Li et al., Nanoelectronics: Growing Y-junction carbon nanotubes, Nature, vol. 402, Nov. 18, 1999, 1999 Macmillan Magazines Ltd., (2 Pages Total), www.nature.com.

M. M. J. Treacy et al., "Exceptionally high Young's modulus observed for individual carbon nanotubes", Nature, vol. 381, Jun. 20, 1996, (3 Pages Total).

M. Terrones et al., "Molecular Junctions by Joining Single-Walled Carbon Nanotubes", vol. 89, No. 7, Physical Review Letters, Aug. 12, 2002, The American Physical Society, pp. 075505-1-075505-4.

M. Terrones et al., "Coalescence of Single-Walled Carbon Nanotubes", vol. 288, Science, May 19, 2000, www.sciencemag.org, pp. 1226-1229.

Zhen Yao et al., "Carbon nanotube intramolecular junctions", Nature, vol. 402, Nov. 18, 1999, www.nature.com, (4 Pages Total), 1999 Macmillan Magazines Ltd.

* cited by examiner

METHOD FOR FUSION OF CARBON NANOSTRUCTURES

TECHNICAL FIELD

The present disclosure is directed to carbon nanotube assemblies.

BACKGROUND

Carbon nanotubes currently represent a heavily researched material for a broad range of applications due to their excellent electrical properties. Recently, carbon nanotube films have been studied as a potential replacement for aluminum and copper conductive mediums. It is speculated that such a replacement could dramatically reduce Joule heat loss, increase current density, and increase safety. However, assembling carbon nanotubes sufficient for macroscopic applications (e.g., into bundles, scaffolds, films, or cables) unacceptably lowers the resulting material's conductivity due to the relatively high tube-tube contact resistance at least partially resulting from van der Waals interactions between tubes. There is therefore a need in the art for improved carbon nanostructure assemblies.

SUMMARY

The present disclosure is directed to a method of making an assembly of fused carbon nanostructures that includes providing a plurality of carbon nanostructures, combining the plurality of carbon nanostructures with a plurality of catalyst particles to provide a catalyst-nanostructure assembly, heating the catalyst-nanostructure assembly to a first temperature sufficient to provide at least one etched portion, thereby providing an etched catalyst-nanostructure assembly, the at least one etched portion being etched from at least one of the plurality of carbon nanostructures and proximal to at least one of the plurality of catalyst particles, contacting the etched catalyst-nanostructure assembly with a carbon source, and heating the etched catalyst-nanostructure assembly and the carbon source to a second temperature sufficient to provide at least one carbon bridge.

Also disclosed herein is an assembly of fused carbon nanostructures having a plurality of carbon nanostructures connected by at least one carbon bridge.

DETAILED DESCRIPTION

The present disclosure is directed to a method of making an assembly of fused carbon nanostructures that includes providing a plurality of carbon nanostructures, combining the plurality of carbon nanostructures with a plurality of catalyst particles to provide a catalyst-nanostructure assembly, heating the catalyst-nanostructure assembly to a first temperature sufficient to provide at least one etched portion, thereby providing an etched catalyst-nanostructure assembly, the at least one etched portion being etched from at least one of the plurality of carbon nanostructures and proximal to at least one of the plurality of catalyst particles, contacting the etched catalyst-nanostructure assembly with a carbon source, and heating the etched catalyst-nanostructure assembly and the carbon source to a second temperature sufficient to provide at least one carbon bridge.

Also disclosed herein is an assembly of fused carbon nanostructures having a plurality of carbon nanostructures connected by at least one carbon bridge.

The method of the present disclosure may include providing a plurality of carbon nanostructures. As used herein, the term "nanostructure" refers to a structure having at least one dimension on the nanoscale, that is, at least on dimension between about 0.1 and 100 nm. It should be understood that "nanostructures" include, but are not limited to, nanosheets, nanotubes, nanoparticles (e.g., polyhedral nanoparticles), nanospheres, nanowires, nanocubes, and combinations thereof. A nanosheet may include a sheet having a thickness on the nanoscale. A nanotube may include a tube having a diameter on the nanoscale. A nanoparticle may include a particle wherein each spatial dimension thereof is on the nanoscale.

According to some aspects, the plurality of carbon nanostructures may include carbon nanotubes. The carbon nanotubes may be single-walled carbon nanotubes (SWNTs), multi-walled carbon nanotubes (MWNTs), or a combination thereof.

The plurality of carbon nanostructures may be provided by any process known in the art sufficient for use with the present disclosure. According to some non-limiting examples, the method may include providing a reactor for preparing an aerosol of carbon nanostructures, such as a reactor that is configured for use with a chemical vapor deposition (CVD) method for the preparation of carbon nanostructures.

Figure 1A:
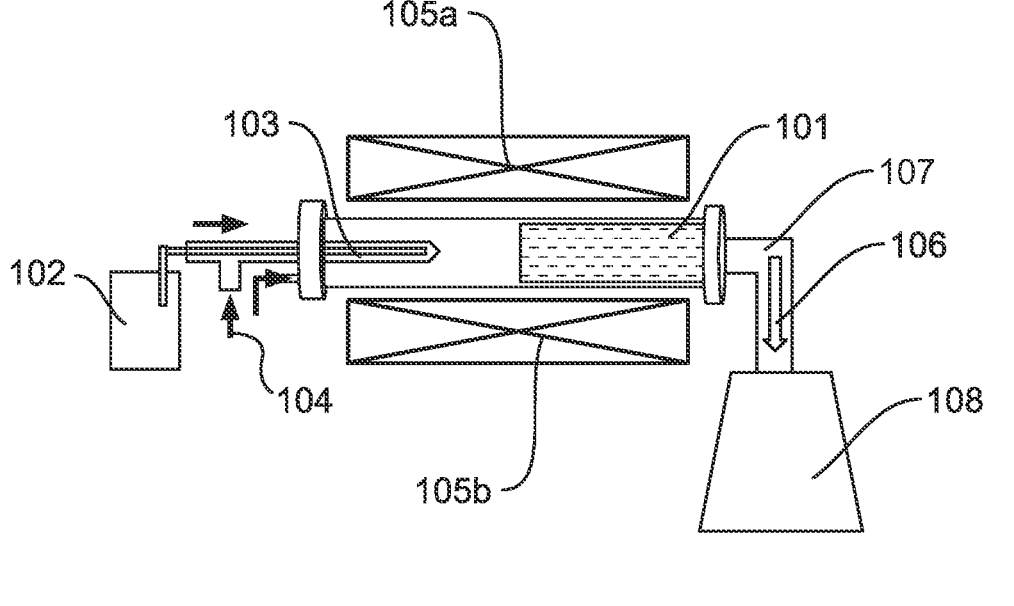
FIG. 1A shows an example of a reactor according to aspects of the present disclosure.
Figure 1A:

FIG. 1A shows an example of a reactor 101 as described herein. As shown in FIG. 1A, reactor 101 may be in communication with source chamber 102, source chamber 102 being configured to house a catalyst and/or catalyst precursor and/or a carbon source. However, it should be understood that the present disclosure is not necessarily limited in this way. For example, reactor 101 may be in fluid communication with one or more source chambers. For example, the catalyst and/or catalyst precursor and/or the carbon source gas may be housed in different source chambers (not shown in FIG. 1A).

The present disclosure is not limited to the type of carbon source(s) used to provide the plurality of carbon nanostructures as described herein. Non-limiting examples of carbon sources include hydrocarbons (e.g., methane, acetylene, and ethylene), alcohols (e.g., ethanol and methanol), benzene, toluene, CO, $CO_2$, and combinations thereof. The carbon source may be provided as a fluid. As used herein, the term "fluid" refers to a state of matter that continuously deforms under an applied shear stress. Examples of fluids include liquid, gas, plasma, and combinations thereof. According to some aspects, the carbon source may be provided as a gas.

As used herein, the term "catalyst" refers to a component that provokes or speeds up a chemical reaction (such as, for example, the synthesis of carbon nanostructures). The catalyst may include, for example, a metal. Examples of metals include, but are not limited to, transition metals, lanthanide metals, actinide metals, and combinations thereof. For example, the catalyst may include a transition metal such as chromium (Cr), molybdenum (Mo), tungsten (W), iron (Fe), cobalt (Co), nickel (Ni), ruthenium (Ru), rhodium (Rh), palladium (Pd), osmium (Os), iridium (Ir), copper (Cu), silver (Ag), gold (Au), cadmium (Cd), scandium (Sc), yttrium (Y), lanthanum (La), platinum (Pt), or a combination thereof.

According to some aspects, a catalyst precursor may be used either in place of or in combination with a catalyst as described herein. As used herein, the term "catalyst precursor" refers to a component that can be converted into a catalyst as described herein. Examples of catalyst precursors include, but are not limited to, transition metal salts, such as a nitrate, acetate, citrate, chloride, fluoride, bromide, iodide, and/or hydrates thereof. For example, the catalyst precursor may be a metallocene, a metal acetylacetonate, a metal phthalocyanine, a metal porphyrin, a metal salt, a metalorganic compound, a metal sulfate, a metal hydroxide, a metal carbonate, or a combination thereof.

According to some aspects, the catalyst and/or catalyst precursor as described herein may be provided as a particle. For example, the catalyst and/or catalyst precursor may be provided as a nanoparticle having a diameter from about 0.01 to 500 nm, optionally from about 0.01 to 250 nm, optionally from about 0.05 to 200 nm, and optionally from about 0.5 to 100 nm.

According to some aspects, catalyst particles and/or catalyst precursor particles may be prepared as described in, for example, Harutyunyan, Avetik R., et al. "CVD Synthesis of Single Wall Carbon Nanotubes under 'Soft' Conditions." Nano Letters, vol. 2, no. 5, 2002, pp. 525-530, https://doi.org/10.1021/nl0255101, the contents of which are explicitly incorporated herein by reference. For example, catalyst precursor particles may be provided by providing a plurality of support particles suspended in a first solvent, combining the suspension with catalyst precursor particles dissolved in a second solvent, the second solvent being the same as or different from the first solvent, mixing, and evaporating at least a portion of the first solvent and/or second solvent. Non-limiting examples of solvents as described herein include water, organic solvents such as aromatic compounds (e.g., benzene, toluene), alcohols (e.g. ethanol, methanol), esters, ethers, ketones (e.g., acetone), amines, and nitrated and halogenated hydrocarbons, and combinations thereof. According to some aspects, catalyst precursor particles may then optionally be heated to an elevated temperature for a certain time period in order to remove additional solvent. According to some aspects, the elevated temperature may be between about 50 and 150° C., optionally between about 90 and 100° C. According to some aspects, the certain time period may be between about 2 and 4 hours, optionally about 3 hours.

The catalyst precursor particles may then optionally be converted to catalyst particles. In some non-limiting examples, catalyst precursor particles may then optionally be converted to catalyst particles by calcination at a temperature between about 400 and 500° C., although the present disclosure is not necessarily limited in this way. According to some aspects, catalyst may be produced from catalyst precursor inside reactor 101 as shown in FIG. 1A. For example, after catalyst precursor has been injected into reactor 101, a component of or all of catalyst precursor, such as a metal, may be reduced into a catalyst prior to the production of carbon nanostructures.

The method of the present disclosure may include injecting the catalyst and/or catalyst precursor and the carbon source into reactor 101. For example, the reactor may be provided with a first inlet 103 for injecting the catalyst and/or catalyst precursor from source chamber 102 to the reactor 101. However, it should be understood that the present disclosure is not necessarily limited in this way. For example, the catalyst and/or catalyst precursor and/or the carbon source gas may be housed in different source chambers as described herein, and each source chamber may be in communication with reactor 101 via the same inlet or a different inlet (not shown in FIG. 1A).

According to some aspects, the catalyst and/or catalyst precursor may be injected into reactor 101 as a liquid, spray, or aerosol. For example, the catalyst and/or catalyst precursor may be mixed with a first carrier gas, such as an inert gas, prior to injection into the reactor. Examples of inert gasses include, but are not limited to, argon gas, hydrogen gas, helium gas, nitrogen gas, and mixtures thereof. For example, as shown in FIG. 1A, the catalyst and/or catalyst precursor and/or carbon source may be combined with a first carrier gas via a carrier gas inlet 104 prior to injection into reactor 101.

According to some aspects, the carbon source may be injected into reactor 101 as a liquid, spray, or aerosol.

According to some aspects, an aerosol of carbon nanostructure may be produced in reactor 101. For example, the carbon source may decompose at the surface of the catalyst particles in the reactor by thermal and/or catalytic decomposition, thereby resulting in the formation and/or growth of carbon nanostructures as described herein.

According to some aspects, the temperature of reactor 101 may be maintained and/or varied using one or more heat sources, such as a furnace. For example, as shown in FIG. 1A, heat source 105a may be proximal to reactor 101 on a first side. Additionally, heat source 105b may be provided proximal to reactor 101 on a second side. However, the disclosure is not necessarily limited in this way. For example, one or more heat sources may be proximal to one, two, or more sides of one or more portions of reactor 101, or may completely surround one or more portions of reactor 101 (not shown in FIG. 1A).

The one or more heat sources may maintain the temperature of reactor 101 at a temperature sufficient for one or more of the reactions described herein. For example, heat sources 105a and 105b may maintain the temperature of reactor 101 at a temperature sufficient for reducing the catalyst precursor into a catalyst and/or for the formation of carbon nanostructures as described herein. In some non-limiting examples, the one or more heat sources may maintain the temperature of reactor 101 at a temperature of between about 200 and 1600° C., optionally between about 700 and 1200° C.

As shown in FIG. 1A, carbon nanostructures may be provided in an aerosolized stream 106 directly from reactor 101. Aerosolized stream 106 may exit reactor 101 and travel along pathway 107 (e.g., through a tube) to hood 108 where aerosolized stream 106 may be deposited onto a substrate 109. In some non-limiting examples, substrate 109 may be a porous flexible substrate. According to some aspects, substrate 109 may be a static substrate. Alternatively, substrate 109 may be a movable substrate. For example, while not shown in FIG. 1A, substrate 109 may be attached to a conveyor belt or a roll-to-roll system.

As shown in FIG. 1A, aerosolized stream 106 may be deposited onto substrate 109 in order to provide a plurality of carbon nanostructures 110 on a surface of substrate 109. In some non-limiting examples, plurality of carbon nanostructures 110 may be a film of carbon nanostructures. As used herein, the term "film," alternatively referred to as a "mat," refers to a layer of material, such as a layer of carbon nanostructures, having a thickness ranging from atomically thin to no more than about 25 mm, optionally no more than about 10 mm, and optionally no more than about 5 mm.

It should be understood that FIG. 1A and the corresponding description describe one non-limiting example of providing a plurality of carbon nanostructures as described herein. In addition or as an alternative to this disclosure, the method may include providing a plurality of carbon nanostructures as described in Applicant's U.S. Patent Publication Nos. 2021/0104721 and 2019/0036102, and/or Applicant's U.S. patent application Ser. No. 17/882,205, the contents of which are incorporated herein by reference in their entirety.

Figure 1B:
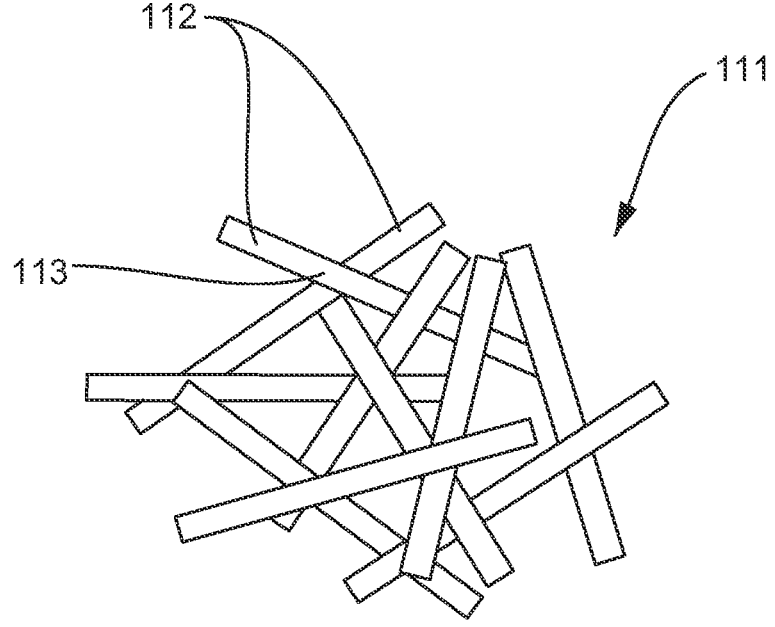
FIG. 1B shows an example of a plurality of carbon nanostructures according to aspects of the present disclosure.

FIG. 1B shows an example of a plurality of carbon nanostructures as provided by the present disclosure. In particular, FIG. 1B shows a film 111 of carbon nanostructures 112 as described in in relation to FIG. 1A. As shown in FIG. 1B, film 111 may include a plurality of carbon nanostructures 112 arranged such that at least one contact point 113 between carbon nanostructures 112 exists. As used herein, a "contact point" refers to a point where the surface of a first carbon nanostructure is in physical contact with a surface of a second carbon nanostructure. For example, in an example wherein the carbon nanostructures include carbon nanotubes, each contact point may be provided by tube-tube contact as known in the art. It should be understood that in this way, film 111 may include one or more pores or openings between contact points, thus forming a porous structure.

While not shown in FIG. 1B, it should be understood that film 111 may be provided on a substrate, such as substrate 109 as shown in FIG. 1A.

The method of the present disclosure may further include combining the plurality of carbon nanostructure with catalyst particles to provide a catalyst-nanostructure assembly. According to some aspects, combining the plurality of carbon nanostructure with catalyst particles may include providing catalyst precursor particles in contact with the plurality of carbon nanostructures, and converting at least a portion of the plurality of catalyst precursor particles to catalyst particles as described herein.

Figure 2A:
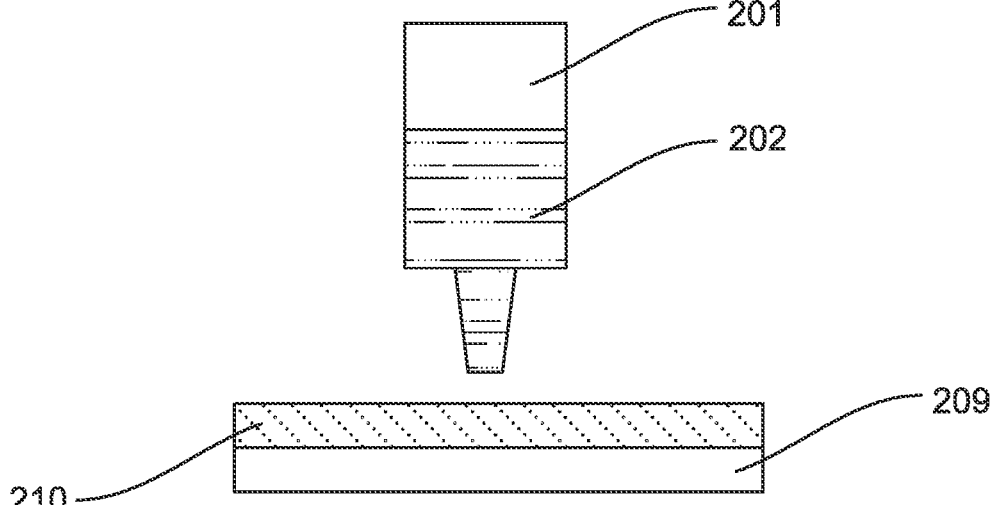
FIG. 2A shows an example of a source of catalyst precursor particles according to aspects of the present disclosure.

For example, FIG. 2A shows a plurality of carbon nanostructures 210 provided on a substrate 209 (e.g., as described in relation to FIGS. 1A and 1B). FIG. 2A also shows a source 201 of catalyst precursor particles 202, source 201 being in communication with plurality of carbon nanostructures 210 such that catalyst precursor particles 202 may be combined with (e.g., deposited on and/or embedded in) plurality of carbon nanostructures 210.

According to some aspects, catalyst precursor particles 202 may include any catalyst precursor as described herein. In some non-limiting examples, catalyst precursor particles 202 may comprise catalyst precursor nanoparticles.

According to some aspects, catalyst precursor particles 202 may be provided as a fluid as described herein. In some non-limiting examples, the fluid may include a solution, such as a colloidal solution. According to some aspects, the fluid may be a solution having a solvent as described herein.

In some non-limiting examples, the fluid may include catalyst precursor particles dissolved in a liquid as described in, for example, U.S. Pat. No. 11,325,833, the contents of which are explicitly incorporated herein by reference. In some non-limiting examples, the fluid may include catalyst precursor particles dissolved in a liquid as described in, for example, Harutyunyan, Avetik R., et al. "CVD Synthesis of Single Wall Carbon Nanotubes under 'Soft' Conditions." Nano Letters, vol. 2, no. 5, 2002, pp. 525-530, https://doi.org/10.1021/nl0255101.

According to some aspects, catalyst precursor particles 202 may be provided in contact with plurality of carbon nanostructures 210 in an inert atmosphere. As used herein, the term "inert atmosphere" refers to an atmosphere having only inert gases, as described herein.

The method of the present disclosure may include converting catalyst precursor particles 202 to catalyst particles as described herein. For example, converting catalyst precursor particles 202 to catalyst particles may include heating the plurality of carbon nanostructures 210 and catalyst precursor particles 202 in an inert atmosphere at a temperature sufficient to convert catalyst precursor particles 202 to catalyst particles. According to some aspects, catalyst precursor particles 202 may be converted to catalyst particles at a temperature between about 300 and 1800° C., optionally between about 400 and 1600° C., optionally between about 400 and 1000° C., and optionally between about 400 and 500° C.

Figure 2B:
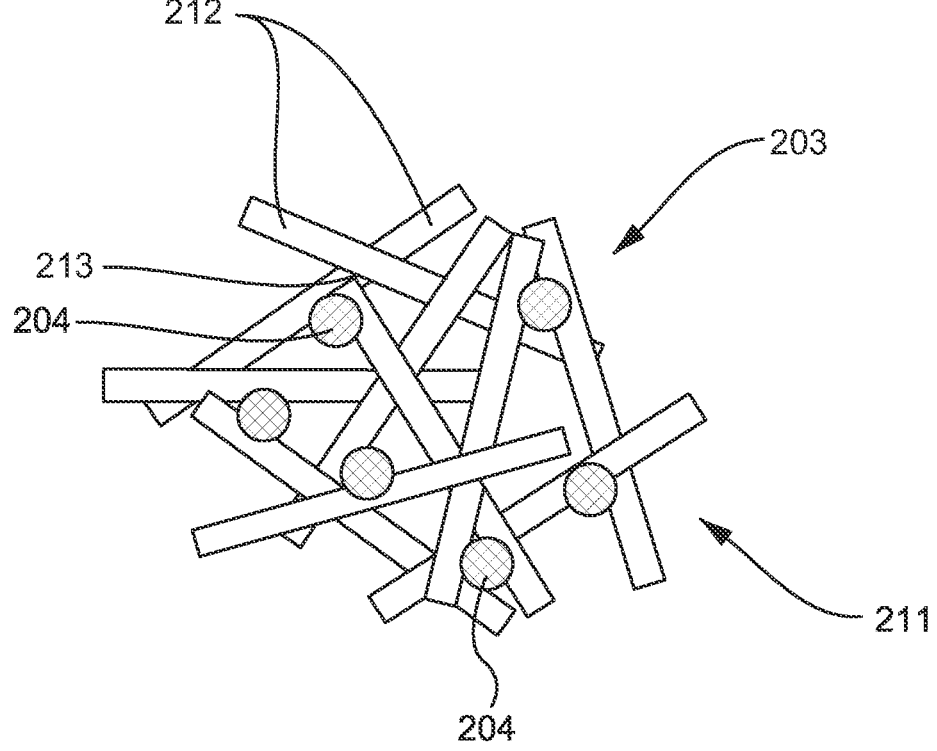
FIG. 2B shows an example catalyst-nanostructure assembly according to aspects of the present disclosure.

However, it should be understood that the present disclosure is not necessarily limited in this way. For example, source 201 as described in relation to FIG. 2A may be a source of catalyst particles in addition to or instead of catalyst precursor particles 202 such that catalyst particles are combined directly with plurality of carbon nanostructures 210. In the case where source 201 provides only catalyst particles, it will not be necessary to convert catalyst precursor particles to catalyst particles as described herein FIG. 2B shows an example catalyst-nanostructure assembly 203 as described herein. In particular, FIG. 2B shows a film 211 of carbon nanostructures 212, similar to film 111 of carbon nanostructures 112 as described in relation to FIG. 1B. FIG. 2B also shows that catalyst-nanostructure assembly 203 includes a plurality of catalyst particles 204 as described herein. As shown in FIG. 2B, at least a portion of catalyst particles 204 may be provided proximal to contact points 213 between carbon nanostructures 212, as described, for example, in relation to FIG. 1B.

According to some aspects, catalyst particles 202 may be provided proximal to at least 10% of the contacts points contained by film 111 of carbon nanostructures 112, optionally at least about 20%, optionally at least about 30%, optionally at least about 40%, optionally at least about 50%, optionally at least about 60%, optionally at least about 70%, optionally at least about 80%, optionally at least about 90%, and optionally about 100%.

According to some aspects, catalyst-nanostructure assembly 203 may include up to about 50% w/w carbon nanostructures, optionally up to about 40% w/w, optionally up to about 30% w/w, optionally up to about 20% w/w, optionally up to about 10% w/w. According to some aspects, catalyst-nanostructure assembly 203 may include between about 0.1 and 50% w/w carbon nanostructures, optionally between about 0.1 and 20% w/w, optionally between about 1 and 20% w/w, optionally between about 5 and 20% w/w, and optionally between about 5 and 10% w/w.

The method of the present disclosure may include heating the catalyst-nanostructure assembly to etch at least a portion of the carbon nanostructures of the catalyst-nanostructure assembly.

Figure 3A:
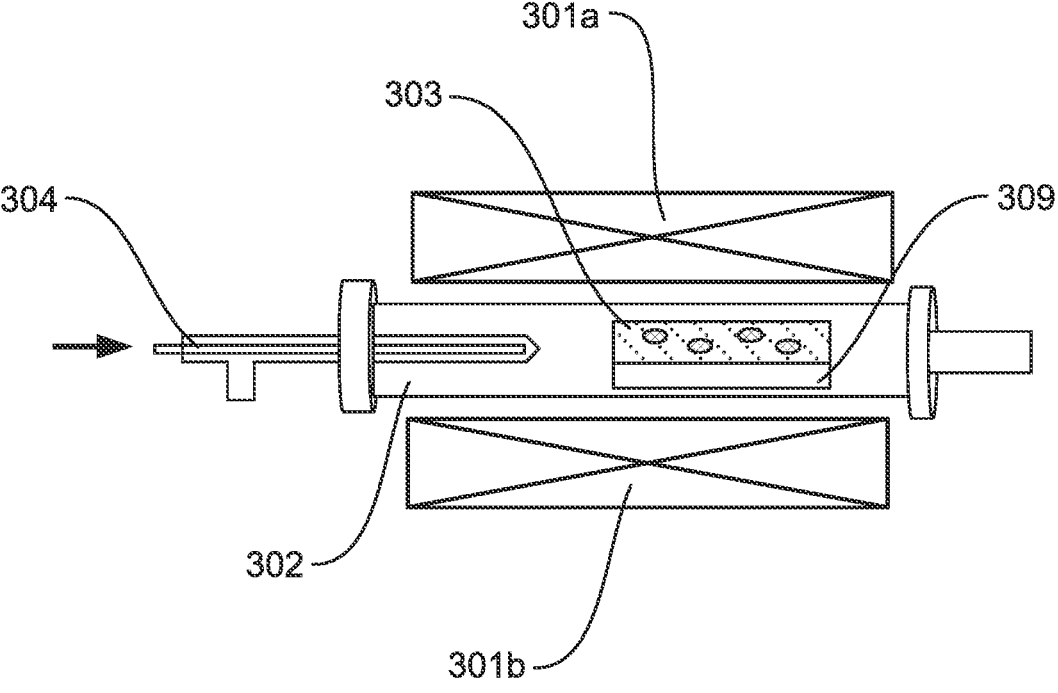
FIG. 3A shows an example heating apparatus according to aspects of the present disclosure.

For example, FIG. 3A shows a catalyst-nanostructure assembly 303 similar to catalyst-nanostructure assembly 203 described in relation to FIG. 2B. As shown in FIG. 3A, catalyst-nanostructure assembly 303 may optionally be provided on a substrate 309 as described herein.

According to some aspects, catalyst-nanostructure assembly 303 may be heated using one or more heat sources. For example, as shown in FIG. 3A, catalyst-nanostructure assembly 303 may be provided in a heating apparatus 302, such as a quartz tube. In this example, heat source 301a may be proximal to heating apparatus 302 on a first side. Additionally, heat source 301b may be provided proximal to heating apparatus 302 on a second side. However, the disclosure is not necessarily limited in this way. For example, one or more heat sources may be proximal to one, two, or more sides of one or more portions of heating apparatus 302, or may completely surround one or more heating apparatus 302 (not shown in FIG. 3A).

According to some aspects, the one or more heat sources may maintain the temperature of heating apparatus 302 at a temperature suitable for etching carbon nanostructures as described herein. For example, heat sources 301a, 301b may maintain the temperature of heating apparatus 302 at a temperature of between about 200 and 700° C., optionally between about 300 and 600° C., and optionally between about 400 and 500° C.

As shown in FIG. 3A, heating apparatus 302 may be provided with a first inlet 304. In this example, first inlet 304 may be configured to provide inert gas to heating apparatus 302 sufficient to provide an inert atmosphere within heating apparatus 302 as described herein.

Figure 3B:
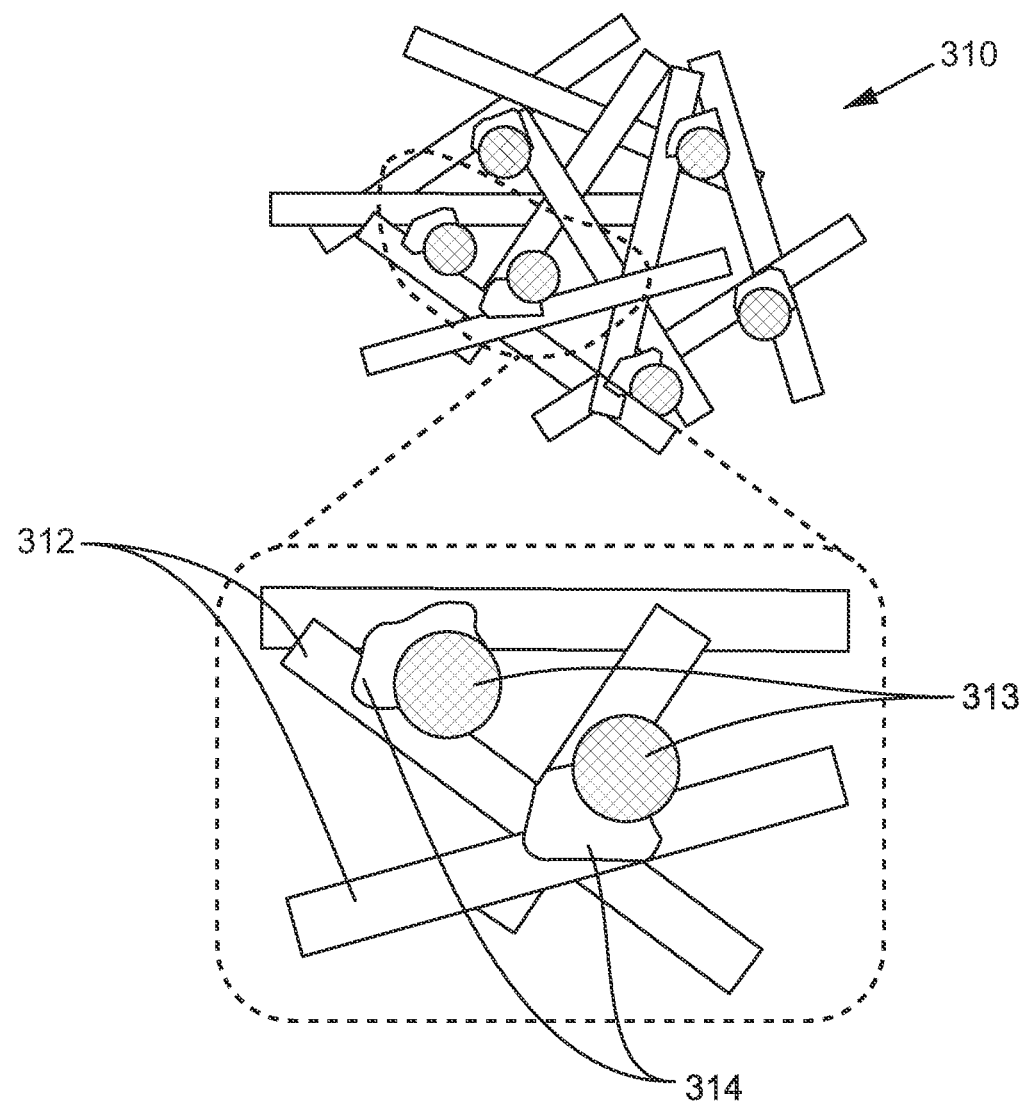
FIG. 3B shows an example etched catalyst-nanostructure assembly according to aspects of the present disclosure.

FIG. 3B shows an example of an etched catalyst-nanostructure assembly 310 as described herein. For example, as shown in FIG. 3B, etched a catalyst-nanostructure assembly 310 may include carbon nanostructures 312 similar to carbon nanostructures 112 and 212 as shown in FIGS. 1B and 2B, respectively. FIG. 3B also shows that catalyst-nanostructure assembly 310 includes a plurality of catalyst particles 313 as described herein. As shown in FIG. 3B, one or more of the etched portions 314 of etched catalyst-nanostructure assembly 310 may include portions of nanostructures 312 proximal to one or more catalyst particles 313.

The method of the present disclosure may include providing the etched catalyst-nanostructure assembly as described herein with at least one carbon bridge. As used herein, the term "carbon bridge" refers to one or more carbon components attached to at least two carbon nanostructures of a carbon nanostructure assembly. The attachment may be chemical, physical, or combination thereof. Examples of chemical attachments include chemical bonds, that is, ionic bonds, metallic bonds, covalent bonds, and combinations thereof. Examples of physical attachments include physisorption, physical absorption, and combinations thereof.

In this way, carbon bridges may fuse at least two carbon nanostructures of a carbon nanostructure assembly.

According to some aspects, providing the etched catalyst-nanostructure assembly with at least one carbon bridge may include contacting the etched catalyst-nanostructure assembly with a carbon source and heating the etched catalyst-nanostructure assembly and carbon source to a temperature sufficient to provide at least one carbon bridge. In particular, the temperature may be a temperature sufficient for the carbon source to decompose at the surface of at least a portion of the catalyst particles contained by the etched catalyst-nanostructure assembly.

Figure 4A:
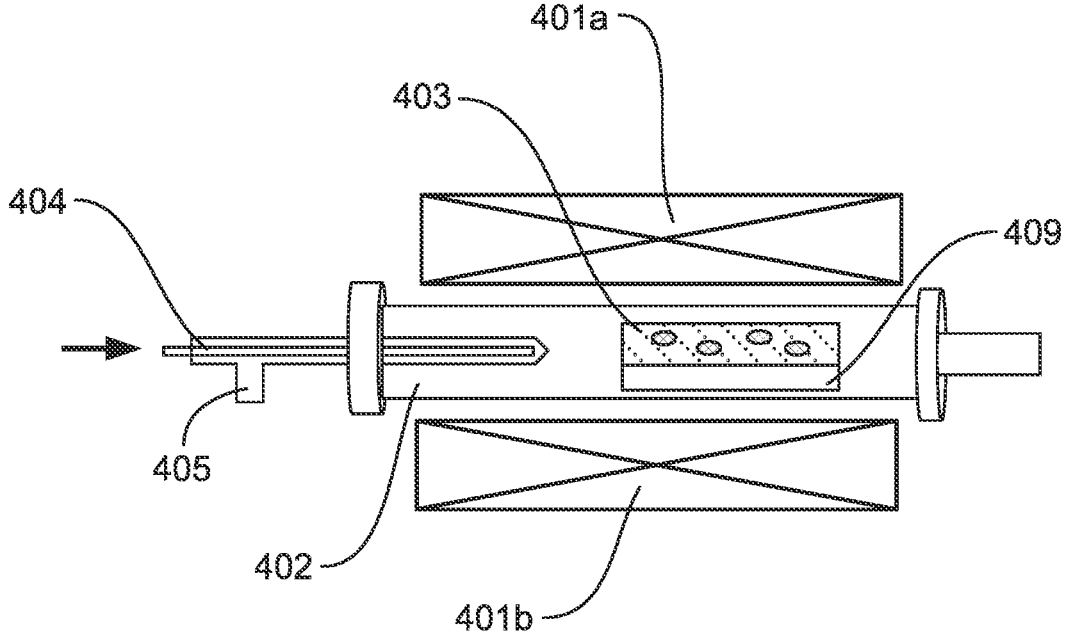
FIG. 4A shows an example heating apparatus according to aspects of the present disclosure.

FIG. 4A shows an example of an etched catalyst-nanostructure assembly 403 on a substrate 409 provided within a heating apparatus 402 (such as a quartz tube), similar to heating apparatus 302 as shown in FIG. 3A. In this example, heating apparatus 402 may be provided in communication with a heat source 401a that is proximal to heating apparatus 402 on a first side. Additionally, a second heat source 401b may be provided proximal to heating apparatus 402 on a second side. However, as described in relation to the heating apparatus 302 shown in FIG. 3A, heating apparatus 402 as shown in FIG. 4A is not necessarily limited in this way. For example, one or more heat sources may be proximal one, two, or more sides of one or more portions of heating apparatus 402, or may completely surround one or more heating apparatus 402 (now shown in FIG. 4A).

As shown in FIG. 4A, heating apparatus 402 may be provided with a first inlet 404 configured to inject a carbon source into heating apparatus 402. The carbon source may be any carbon source as described herein and may be injected into heating apparatus 402 as a liquid, spray, or aerosol. For example, the carbon source may be mixed with a first carrier gas, such as an inert gas, prior to injection into heating apparatus 402. In some non-limiting examples, heating apparatus 402 may also optionally be provided with a second inlet 405. Second inlet 405 may be configured to provide a second inert gas to heating apparatus 402, the second inert gas being the same as or different from the inert gas provided with the carbon source as described herein.

It should be understood that heating apparatus 402 as shown in FIG. 4A may be the same heating apparatus 302 used to provide the etched catalyst-nanostructure assembly 310 as shown in, for example, FIG. 3A. In this example, a carbon source may be provided to the heating apparatus 302 as shown in FIG. 3A, and at least one carbon bridge may be formed by adjusting the temperature of heating apparatus 302 to a temperature sufficient for forming at least one carbon bridge as described herein. Alternatively, heating apparatus 402 as shown in FIG. 4A may be a different heating apparatus from heating apparatus 302 as shown in FIG. 3A.

Figure 4B:
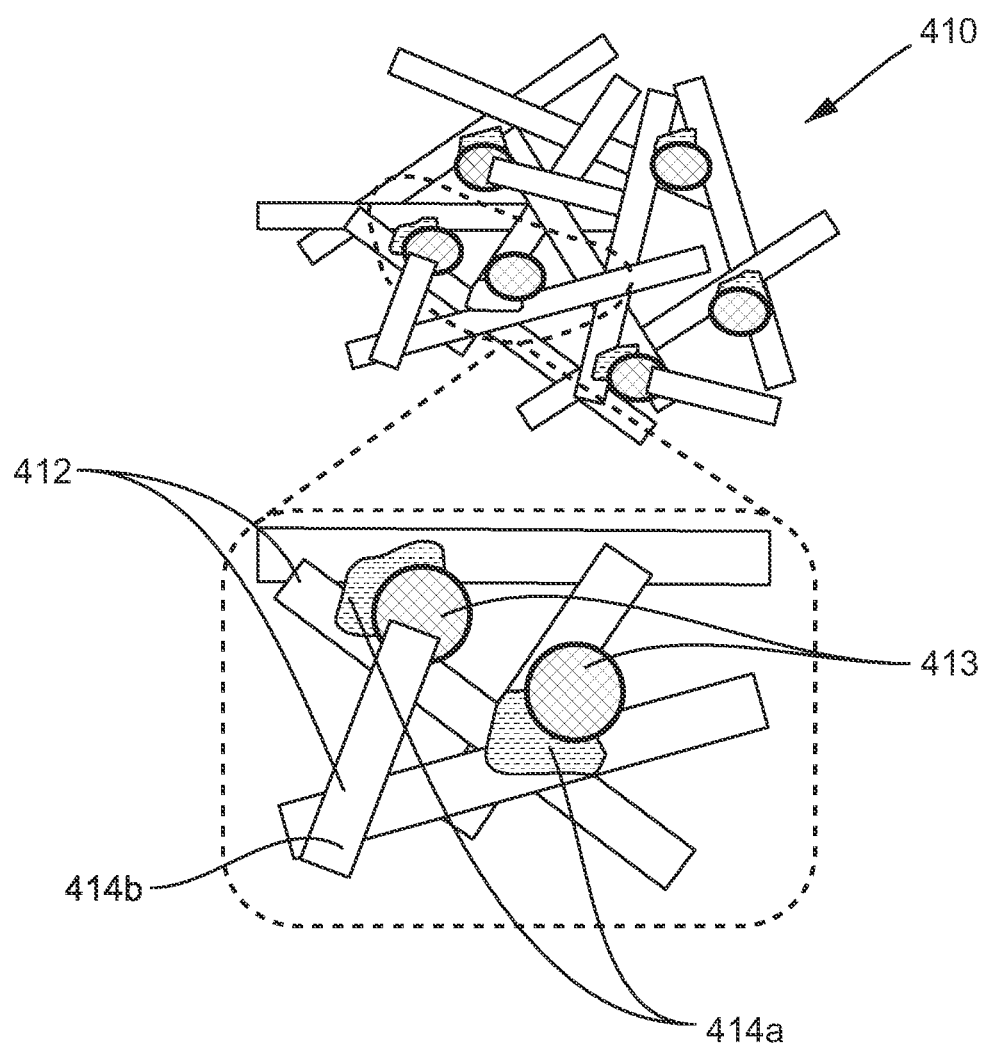
FIG. 4B shows an example assembly of fused carbon nanostructures according to aspects of the present disclosure.

It should also be understood that by providing the etched catalyst-nanostructure assembly as described herein with at least one carbon bridge, an assembly of fused carbon nanostructures may be obtained. For example, FIG. 4B shows an example of an assembly of fused carbon nanostructures 410 as described herein. As shown in FIG. 4B, assembly of fused carbon nanostructures 410 may include carbon nanostructures 412, similar to carbon nanostructures 112, 212, and 312 as shown in FIGS. 1B, 2B, and 3B, respectively. FIG. 4B also shows that assembly of fused carbon nanostructures 410 includes a plurality of catalyst particles 413, similar to plurality of catalyst particles 313 as shown in FIG. 3B.

The method of the present disclosure may further include removing at least a portion of catalyst particles 413 from the assembly of fused carbon nanostructures 410. In some non-limiting examples, removing catalyst particles 413 may include contacting assembly of fused carbon nanostructures 410 with an acid. Example acids useful according to the present disclosure include, but are not limited to, hydrochloric acid, nitric acid, sulfuric acid, dilutions thereof, and combination thereof. Additionally or alternatively, removing catalyst particles 413 may include heating assembly of fused carbon nanostructures 410. According to some aspects, assembly of fused carbon nanostructures 410 maybe heated to a temperature of between about 200 and 500° C., optionally between about 250 and 450° C. It should be understood that heating assembly of fused carbon nanostructures 410 may include providing heat by any suitable heat source known in the art, such as a microwave heat source. According to some aspects, heating may be performed under oxygen or an atmospheric environment. As used herein, an "atmospheric environment" refers to the envelope of air surrounding the Earth.

In some non-limiting examples, removing catalyst particles 413 from assembly of fused carbon nanostructures 410 may be accomplished as described in Harutyunyan, Avetik R., et al. "Purification of Single-Wall Carbon Nanotubes by Selective Microwave Heating of Catalyst Particles." The Journal of Physical Chemistry B, vol. 106, no. 34, 2002, pp. 8671-8675, https://doi.org/10.1021/jp0260301, the contents of which are explicitly incorporated herein by reference. For example, removing catalyst particles 413 may include heating assembly of fused carbon nanostructures 410 and subsequently contacting assembly of fused carbon nanostructures 410 with an acid as described herein. In this way, at least a portion of a carbon passivation layer that forms on an outer surface of catalyst particles 413 may be weakened and/or removed via oxidation and/or rupturing at an increased temperature prior to the removal of at least a portion of catalyst particles 413 from assembly of fused carbon nanostructures 410 by the acid.

The method of the present disclosure may include removing at least 10% w/w of catalyst particles 413 from the assembly of fused carbon nanostructures 410, optionally at least about 20% w/w, optionally at least about 30% w/w, optionally at least about 40% w/w, optionally at least about 50% w/w, optionally at least about 60% w/w, optionally at least about 70% w/w, optionally at least about 80% w/w, optionally at least about 90% w/w, optionally at least about 99% w/w, and optionally about 100% w/w.

FIG. 4B also shows an example of a plurality of first carbon bridges 414*a*. It should be understood that first carbon bridges 414*a* may be provided in, for example, the space provided by etched portions 314 of the etched catalyst-nanostructure assembly 310 as shown in FIG. 3B. In some non-limiting examples, first carbon bridges 414*a* may include graphene.

FIG. 4B also shows an example of a plurality of second carbon bridges 414*b* provided proximal to at least one of the plurality of catalyst particles 413. In this example, second carbon bridges 414*b* may include one or more carbon nanostructures as described herein, such as one or more carbon nanotubes.

It should be understood that the present disclosure is not necessarily limited to the example shown in FIG. 4B. For example, assembly of fused carbon nanostructures 410 may include only first carbon bridges 414*a* or only second carbon bridges 414*a*. Additionally or alternatively, assembly of fused carbon nanostructures 410 may include a plurality of third, fourth, fifth, or more carbon bridges (not shown), wherein each of the third, fourth, fifth, or more carbon bridges includes a different carbon component (e.g., one or more carbon nanostructures other than carbon nanotubes).

As described herein, the at least one carbon bridge may be formed by heating etched catalyst-nanostructure assembly 403 as shown in FIG. 4A and a carbon source to a temperature sufficient for the carbon source to decompose at the surface of the catalyst particles of the etched catalyst-nanostructure assembly 403 by thermal and/or catalytic decomposition as described herein. According to some aspects, etched catalyst-nanostructure assembly 403 may be heated to a temperature of between about 500 and 1600° C., optionally between about 700 and 1200° C.

The method of the present disclosure may optionally including removing the assembly of fused carbon nanostructures from a substrate as described herein.

The present disclosure is also directed to assemblies of fused carbon nanostructures obtainable by the method described herein. For example, the assembly of fused carbon nanostructures may include a plurality of carbon nanostructures connected by at least one carbon bridge as described herein. According to some aspects, the plurality of carbon nanostructures may include carbon nanotubes. In some non-limiting examples, the at least one carbon bridge may include graphene, a carbon nanotube, or a combination thereof.

The present disclosure is also directed to methods of using the assembly of fused carbon nanostructures as described herein. For example, the assembly of fused carbon nanostructures may be provided as a component of an electrode.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C. B and C, or A and B and C, where any such combinations may contain one or more member or members of A. B. or C. Nothing disclosed herein is intended to be dedicated to the public regardless of whether such disclosure is explicitly recited in the claims.

Moreover, all references throughout this application, for example patent documents including issued or granted patents or equivalents; patent application publications; and non-patent literature documents or other source material; are hereby incorporated by reference herein in their entireties, as though individually incorporated by reference.

The following examples are put forth so as to provide those of ordinary skill in the art with a complete disclosure and description of how to make and use aspect of the present disclosure, and are not intended to limit the scope of what the inventors regard as their invention nor are they intended to represent that the experiments described below are all or the only experiments performed. Efforts have been made to ensure accuracy with respect to numbers used (e.g. amounts, dimensions, etc.) but some experimental errors and deviations should be accounted for.

What is claimed is:

1. A method of making an assembly of fused carbon nanostructures comprising:

providing a plurality of carbon nanostructures;

combining the plurality of carbon nanostructures with a plurality of catalyst particles to provide a catalyst-nanostructure assembly;

heating the catalyst-nanostructure assembly to a first temperature and maintaining the catalyst-nanostructure assembly at the first temperature sufficient to provide at least one etched portion, thereby providing an etched catalyst-nanostructure assembly, wherein the at least one etched portion is etched from at least one of the plurality of carbon nanostructures and is proximal to at least one of the plurality of catalyst particles;

contacting the etched catalyst-nanostructure assembly with a carbon source; and heating the etched catalyst-nanostructure assembly and the carbon source to a second temperature sufficient to provide at least one carbon bridge between the plurality of carbon nanostructures, wherein the second temperature is different from the first temperature.

2. The method according to claim 1, wherein the plurality of carbon nanostructures comprises carbon nanotubes.

3. The method of claim 1, wherein the at least one carbon bridge comprises graphene, a carbon nanotube, or a combination thereof.

4. The method of claim 1, wherein providing the plurality of carbon nanostructures comprises:

providing a catalyst and/or catalyst precursor, a carbon source gas, and a first carrier gas in a reactor; and heating the reactor to a third temperature sufficient to provide a plurality of aerosolized carbon nanostructures; and contacting the plurality of aerosolized carbon nanostructures with a substrate to provide the plurality of carbon nanostructures deposited on the substrate.

5. The method of claim 4, wherein the third temperature is between about 700 and 1200° C.

6. The method of claim 1, wherein the plurality of catalyst particles comprises a transition metal, a lanthanide metal, an actinide metal, or a combination thereof.

7. The method of claim 1, wherein combining the plurality of carbon nanostructures with the plurality of catalyst particles comprises:

providing a plurality of catalyst precursor particles in contact with the plurality of carbon nanostructures, and converting at least a portion of the plurality of catalyst precursor particles to catalyst particles.

8. The method of claim 7, wherein converting the plurality of catalyst precursor particles to catalyst particles comprises heating the plurality of catalyst precursor particles.

9. The method of claim 7, wherein the plurality of catalyst precursor particles comprises at least one transition metal salt.

10. The method of claim 7, wherein the plurality of catalyst precursor particles are provided as a liquid.

11. The method of claim 1, wherein the first temperature is between about 200 and 700° C.

12. The method of claim 1, wherein the second temperature is between about 700 and 1200° C.

13. The method of claim 1, wherein the carbon source comprises a hydrocarbon, an alcohol, benzene, toluene, CO, $CO_2$, or a combination thereof.

14. The method of claim 1, wherein the plurality of catalyst particles comprises catalyst nanoparticles.

* * * * *